United States Patent
Okawa et al.

(10) Patent No.: US 10,221,325 B2
(45) Date of Patent: Mar. 5, 2019

(54) INK COMPOSITION AND METHOD FOR PRODUCING PRINTED OBJECT

(71) Applicants: MIMAKI ENGINEERING CO., LTD., Nagano (JP); MURAKAMI CO., LTD., Tokyo (JP)

(72) Inventors: Masakatsu Okawa, Nagano (JP); Syuji Iwata, Tokyo (JP); Tsuguo Yamaoka, Tokyo (JP)

(73) Assignees: MIMAKI ENGINEERING CO., LTD., Nagano (JP); MURAKAMI CO., LTD., Tokyo (JP)

(*) Notice: Subject to any disclaimer, the term of this patent is extended or adjusted under 35 U.S.C. 154(b) by 0 days.

(21) Appl. No.: 15/580,274

(22) PCT Filed: Jul. 8, 2016

(86) PCT No.: PCT/JP2016/070290
§ 371 (c)(1),
(2) Date: Dec. 7, 2017

(87) PCT Pub. No.: WO2017/007026
PCT Pub. Date: Jan. 12, 2017

(65) Prior Publication Data
US 2018/0148590 A1    May 31, 2018

(30) Foreign Application Priority Data
Jul. 8, 2015  (JP) .................................. 2015-137060

(51) Int. Cl.
*B41J 2/04*    (2006.01)
*B41J 3/413*   (2006.01)
(Continued)

(52) U.S. Cl.
CPC ................. *C09D 11/38* (2013.01); *B41J 2/01* (2013.01); *B41J 2/04* (2013.01); *B41J 3/413* (2013.01); *B41J 11/0015* (2013.01); *B41M 5/00* (2013.01)

(58) Field of Classification Search
CPC ....... B41J 2/01; B41J 2/04; B41J 3/413; B41J 11/0015; B41M 5/00; C09D 11/38; C09D 11/54; C09D 17/006
See application file for complete search history.

(56) References Cited

U.S. PATENT DOCUMENTS

| 6,174,578 B1* | 1/2001 | Holley | C09J 7/0217 156/273.7 |
| 2010/0015360 A1* | 1/2010 | Kyota | C09D 11/101 427/595 |

(Continued)

FOREIGN PATENT DOCUMENTS

| JP | 2010506966 | 3/2010 |
| JP | 2011190342 | 9/2011 |

(Continued)

OTHER PUBLICATIONS

"International Search Report (Form PCT/ISA/210) of PCT/JP2016/070290", dated Aug. 30, 2016, with English translation thereof, pp. 1-4.

*Primary Examiner* — Anh T. N. Vo
(74) *Attorney, Agent, or Firm* — JCIPRNET

(57) ABSTRACT

An ink composition according to the present invention contains an adhesiveness providing component including an acrylate monomer for providing an adhesiveness with respect to a print medium, and a rigidity providing component including at least one substance selected from the group consisting of a multi-functional acrylate monomer and a multi-functional acrylate oligomer.

19 Claims, 1 Drawing Sheet

(51) Int. Cl.
*B41J 11/00*        (2006.01)
*C09D 11/00*        (2014.01)
*C09D 11/38*        (2014.01)
*B41J 2/01*         (2006.01)
*B41M 5/00*         (2006.01)

(56) References Cited

U.S. PATENT DOCUMENTS

2013/0295344 A1\* 11/2013 Nakamura ................. B41J 2/01
                                                    428/195.1
2014/0138013 A1\*  5/2014 Attarawala ............. B32B 37/12
                                                    156/64

FOREIGN PATENT DOCUMENTS

| JP | 2013119585 | 6/2013 |
| JP | 2013142104 | 7/2013 |
| WO | 2010140360 | 12/2010 |

\* cited by examiner

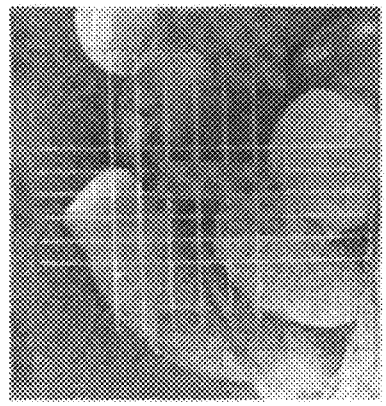
FIG. 1C
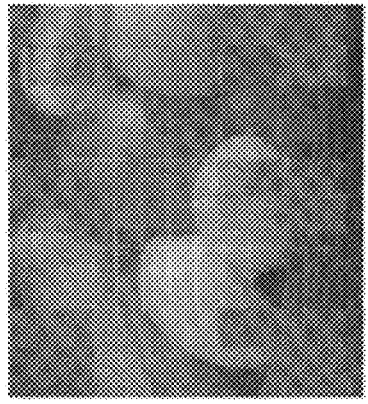
FIG. 1F
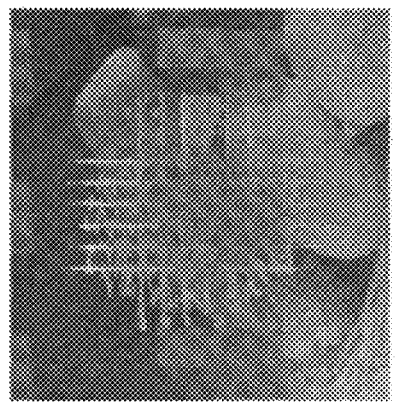
FIG. 1B
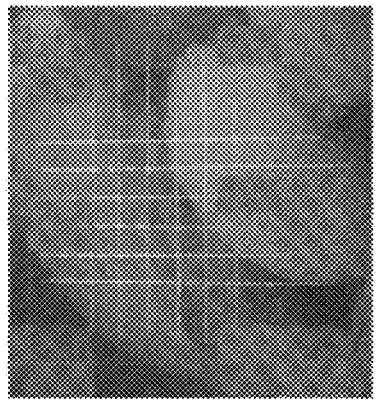
FIG. 1E
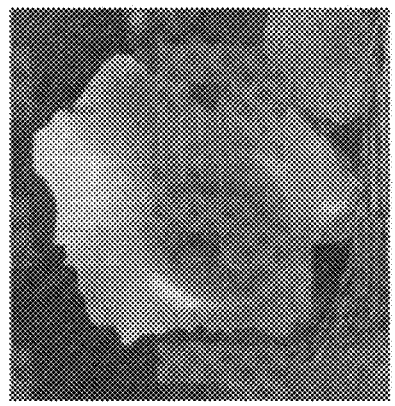
FIG. 1A
FIG. 1D

INK COMPOSITION AND METHOD FOR PRODUCING PRINTED OBJECT

CROSS-REFERENCE TO RELATED APPLICATION

This application is a 371 application of International PCT application Serial no. PCT/JP2016/070290, filed on Jul. 8, 2016, which claims the priority benefit of Japan application no. 2015-137060, filed on Jul. 8, 2015. The entirety of each of the above-mentioned patent applications is hereby incorporated by reference herein and made a part of this specification.

TECHNICAL FIELD

The present invention relates to an ink composition and a method for producing a printed object.

BACKGROUND ART

Patent document 1 recites an energy line curable ink-jet composition intended to improve adhesion to surfaces of recording media of various kinds of material and improve extendability of the composition after being cured.

RELATED ART DOCUMENTS

Patent Documents

Patent document 1: Japanese Unexamined Patent Application Publication No. 2013-142104 (published on Jul. 22, 2013)

SUMMARY OF THE INVENTION

Problems to be Solved by the Invention

The inventors conducted a study on, in forming a primer layer over a print medium and then forming an image on the primer layer, how to improve the adhesiveness of the ink of the image layer relative to the print medium.

As a result, the inventors found that it is necessary to improve the following two properties at the same time. The two properties are adhesiveness between the primer layer and the print medium, and the rigidity of the primer layer itself.

A reason for the importance of the rigidity of the primer layer itself is as follows. If the rigidity of the primer layer itself is insufficient, it is possible for the primer layer to be broken due to curing-caused contraction of the image layer. If the primer layer itself is broken, the image layer printed over the primer layer can be detached, even if the adhesiveness between the primer layer and the print medium is sufficient.

The present invention has been made based on the new finding and has an object to provide an ink composition intended to obtain a printed object in which a layer formed of an respect to a print medium.

Means of Solving the Problems

In order to solve the above-described problem, an ink composition according to the present invention includes: an adhesiveness providing component containing an acrylate monomer for providing such an improved adhesiveness with respect to a print medium that makes the ink composition more adhesive than when the ink composition does not contain the acrylate monomer; and a rigidity providing component for providing a layer resulting from curing of the ink composition with such an improved rigidity that makes the layer more rigid than when the ink composition does not contain the rigidity providing component. The rigidity providing component contains at least one substance selected from the group consisting of a multi-functional acrylate monomer and a multi-functional acrylate oligomer.

Effects of the Invention

The present invention provides such an effect that a printed object in which an image-forming ink has an improved adhesiveness with respect to print media is provided.

BRIEF DESCRIPTION OF THE DRAWING

FIG. 1A to FIG. 1F show the results of adhesion tests in an embodiment using an ink composition according to the present invention.

DESCRIPTION OF EMBODIMENTS

<Ink Composition>

An ink composition according to the present invention includes: an adhesiveness providing component containing an acrylate monomer for providing such an improved adhesiveness with respect to a print medium that makes the ink composition more adhesive than when the ink composition does not contain the acrylate monomer; and a rigidity providing component for providing a layer resulting from curing of the ink composition with such an improved rigidity that makes the layer more rigid than when the ink composition does not comprise the rigidity providing component. The rigidity providing component contains at least one substance selected from the group consisting of a multi-functional acrylate monomer and a multi-functional acrylate oligomer.

By a component for improving adhesiveness with respect to a print medium and a component for improving the rigidity of the ink composition itself, the ink composition improves the adhesiveness of a desired image with respect to print media. That is, by using the ink composition as a foundation on which a desired image layer is formed, a printed object in which the image layer has a higher degree of adhesiveness with respect to print media is provided. This is because the foundation layer has a higher degree of adhesiveness with respect to print media, and the foundation layer itself is prevented from being broken due to curing-caused contraction.

In this specification, the term "adhesiveness" refers to how difficult it is for an ink composition printed on a print medium to be detached from the print medium. In a configuration in which a desired image layer is formed on a printed on a print medium, the term also refers to how easy it is for the image layer to be detached from the print medium. This can be measured through an experiment according to, for example, JISK5600-5-6, adhesion (cross-cut method).

[Print Medium]

The ink composition according to the present invention can be applied to various kinds of print media. Examples include glass and metal.

[Adhesiveness Providing Component]

The adhesiveness providing component included in the ink composition according to the present invention may be an acrylate monomer that provides such an improved adhesiveness with respect to print media that makes the ink composition more adhesive with respect to print media than when the ink composition does not contain the acrylate monomer.

For example, when the print medium is metal, the adhesiveness providing component for metal is such an adhesiveness providing component that provides an adhesiveness improved over an adhesiveness with no such component contained. In the following description, an example of the adhesiveness providing component is provided. The example, however, is not intended as limiting the present invention. The adhesiveness providing component can take various other forms without departing from the unique concept of the present invention that includes: any of various adhesiveness providing components for various kinds of print media; and a rigidity providing component at the same time.

(Adhesiveness Providing Component for Metal)

An example of the adhesiveness providing component for metal is an acrylate monomer having a molecular weight of from 1000 to 10000. A more preferred acrylate monomer is ω-carboxy-polycaprolactone acrylate. A commercially available example is ω-carboxy-polycaprolactone acrylate M5300 (trade name), manufactured by Toagosei Co., LTD.

(Adhesiveness Providing Component for Glass)

An example of the adhesiveness providing component for glass is an epoxy acrylate monomer. A commercially available example is low-viscosity aromatic monoacrylate CN131 (trade name), manufactured by Sartomer.

(Adhesiveness Providing Component Mixture)

By combining the above-described adhesiveness providing components together, a wider range of print media can be applied. For example, the adhesiveness providing component may contain an acrylate monomer that provides an adhesiveness with respect to metal and an acrylate monomer that provides an adhesiveness with respect to glass. This results in an ink composition that can be suitably used both for metal and glass.

For example, the adhesiveness providing component may contain an acrylate monomer having a molecular weight of from 1000 to 10000 and epoxy acrylate monomer. This results in an ink composition that exhibits a higher degree of adhesiveness with respect to both metal and glass.

(Content of Adhesiveness Providing Component)

The content of the adhesiveness providing component included in the ink composition according to the present invention may be set as desired depending on the application. A preferred example is equal to or higher than 25 weight % relative to the weight of the ink composition as a whole, and a more preferred example is equal to or lower than 65 weight %. The content of the adhesiveness providing component for metal is preferably equal to or higher than 20 weight % relative to the weight of the ink composition as a whole, and more preferably, equal to or lower than 40 weight %. The content of the adhesiveness providing component for glass is preferably equal to or higher than 5 weight % relative to the weight of the ink composition as a whole, and more preferably, equal to or lower than 15 weight %. Keeping the contents within these ranges results in an ink composition having an even higher degree of adhesiveness with respect to substrates, in particular, metal and glass.

(Rigidity Providing Component)

The rigidity providing component according to the present invention is a component that provides the layer resulting from curing of the ink composition with such an improved rigidity that makes the layer more rigid than when the ink composition does not contain the rigidity providing component. The rigidity providing component contains at least one substance selected from the group consisting of a multi-functional acrylate monomer and a multi-functional acrylate oligomer. This configuration prevents the ink composition according to the present invention cured on the print medium from contracting when cured.

Specific examples of the multi-functional acrylate monomer and the multi-functional acrylate oligomer are as follows. A preferred example is an acrylate monomer or an oligomer having two or more functional groups, and a more preferred example is an acrylate monomer or an oligomer having three or more functional groups. Another more preferred example is at least one substance selected from the group consisting of a multi-functional acrylate monomer having an acryloyl base via a soft segment and a multi-functional acrylate oligomer having an acryloyl base via a soft segment. Examples of the soft segment include ethylene oxide, propylene oxide, and caprolactone.

Examples of the multi-functional acrylate monomer include EO-modified glycerin tri(meth)acrylate, PO-modified glycerin tri(meth)acrylate, EO-modified pentaerythritol tri(meth)acrylate, PO-modified pentaerythritol tri(meth)acrylate, EO-modified trimethylolpropane tri(meth)acrylate, PO-modified trimethylolpropane tri(meth)acrylate, EO-modified pentaerythritol tetra(meth)acrylate, PO-modified pentaerythritol tetra(meth)acrylate, caprolactone-modified trimethylolpropane triacrylate, and caprolactone-modified dipentaerythritol hexa-acrylate.

Examples of the multi-functional acrylate oligomer include hyperbranched acrylate, epoxy acrylate oligomer, urethane acrylate oligomer having polyester skeleton, and urethane acrylate oligomer having polyether skeleton.

Examples of commercially available products suitably used as the rigidity providing component included in the ink composition according to the present invention include dendrimer-type polyester acrylate V1000 (trade name), manufactured by Osaka Organic Chemical Industry Ltd., and trifunctional group monomer (SR9051), which is EO-modified multi-functional acrylate and manufactured by Sartomer.

(Content of Rigidity Providing Component)

Some of the above-described adhesiveness providing components also function as the rigidity providing component. For example, ω-carboxy-polycaprolactone acrylate M5300 (trade name) and low-viscosity aromatic monoacrylate CN131 also have a rigidity providing function. When the rigidity providing component contained is different from the adhesiveness providing component, that is, when a multi-functional acrylate monomer and a multi-functional acrylate oligomer are contained, the rigidity providing component is preferably equal to or higher than 2 weight % relative to the weight of the ink composition as a whole, more preferably equal to or higher than 3 weight %, still more preferably equal to or lower than 10 weight %, and even more preferably equal to or lower than 8 weight %.

(Other Components)

In the ink composition according to the present invention, some other components may be additionally contained as necessary. Examples of other components include additives such as diluent, viscosity modifier, polymerization initiator, surface tension regulator, polymerization inhibitor, and anti-oxidant.

The diluent may be selected as desired depending on the application in which the ink composition is used. An example is isobornyl acrylate.

The viscosity modifier may be added to obtain a preferred viscosity according to the printing method, such as ink-jet printing, or according to the application in which the printed object to be produced is used. An example is benzil acrylate.

The polymerization initiator may be selected as desired according to, for example, the kind of monomer contained in the ink composition and according to a desired degree of polymerization. An example is phosphine oxide phenylbis (2,4,6-trimethylbenzoyl) (Irgacure 819 (trade name)), manufactured by BASF. The content of the polymerization initiator may be selected as desired according to the kind of monomer contained in the ink composition and according to the kind of the polymerization initiator. A preferred example is equal to or higher than 1 weight % relative to the weight of the ink composition as a whole, a more preferred example is equal to or higher than 4.5 weight %, a still more preferred example is equal to or lower than 10 weight %, which results in a more satisfactory ink composition, and an even more preferred example is equal to or lower than 6 weight %. At equal to or higher than 4.5 weight %, such an ink composition is provided that has a higher degree of adhesiveness with respect to print media of acrylic resin, as well as print media of metal and glass.

[Applications in which the Ink Composition according to the Present Invention is Used]

An example of the ink composition according to the present invention is an ink composition for forming a primer layer printed on the print medium to serve as a foundation of an image layer. As the printing method, an ink-jet method can be suitably used. Therefore, one form of the ink composition according to the present invention is an ink composition for ink-jet printing.

By forming a primer layer using the ink composition according to the present invention, an image layer formed over the primer layer closely contacts the print medium with a higher degree of adhesive strength. This enables such a printed object to be produced that the image layer is more difficult to be detached from the print medium. The primer layer refers to a layer formed on a print medium to serve as a foundation of an image layer.

<Method for Producing Printed Object>

The method according to the present invention for producing a printed object includes: a primer layer forming step of printing the ink composition according to the present invention on a print medium so as to form a primer layer; and an image layer forming step of forming an image layer over the primer layer.

[Primer Layer Forming Step]

In the primer layer forming step, the ink composition according to the present invention is printed on a print medium so as to form a primer layer.

There is no particular limitation to the method of forming the primer layer. A preferred example is to use an ink-jet printer to print the ink composition for forming the primer layer. Using an ink-jet printer facilitates the formation of the primer layer on the print medium.

[Image Layer Forming Step]

In the image layer forming step, an image layer is formed over the primer layer. In the present invention, the image layer refers to a layer formed over the primer layer. An example is an outer layer of the printed object on which a desired picture and/or the like can be represented. The image layer is formed of an ink for forming the image layer. There is no particular limitation to the kind of the image, and any image is possible insofar as the image can be visually recognized by manufacturers, users of the printed object, purchasers, and the like. Examples of the image include any pictures, characters, and patterns. The image layer may be other than those that give aesthetic pleasure; the image layer in this specification encompasses those outer layers obtained by printing intended to effect desired surface treatment so that the outer layers are visually recognized by users.

There is no particular limitation to the method of forming the image layer. A preferred example is to use an ink-jet printer to print an ink composition for forming the image layer. Using an ink-jet printer facilitates the formation of the image layer over the print medium.

It is preferable to use an ink-jet printer to print both in the primer layer forming step and the image layer forming step. This enables such a printed object to be produced using one ink-jet printer that the image layer has a significantly superior adhesiveness with respect to print media.

The present invention will not be limited to the above-described embodiments, and modifications may be employed without departing from the scope of the appended claims. Also, any embodiments obtained by combining techniques disclosed in the above-described embodiments are encompassed within the technical scope of the present invention.

[Additional Notes]

The ink composition according to the present invention includes: an adhesiveness providing component containing an acrylate monomer for providing such an improved adhesiveness with respect to a print medium that makes the ink composition more adhesive than when the ink composition does not contain the acrylate monomer; and a rigidity providing component for providing a layer resulting from curing of the ink composition with such an improved rigidity that makes the layer more rigid than when the ink composition does not comprise the rigidity providing component. The rigidity providing component contains at least one substance selected from the group consisting of a multi-functional acrylate monomer and a multi-functional acrylate oligomer.

In the above-described configuration, the adhesiveness providing component causes a layer formed of the ink composition ejected onto the print medium to closely contact the print medium, and the rigidity providing component prevents the layer itself from being broken due to curing-caused contraction. This enables such a printed object to be provided that an image layer has an improved adhesiveness with respect to a print medium.

In the ink composition according to the present invention, the print medium may be a metal. This enables such a printed object to be provided that an image layer has an improved adhesiveness with respect to print media made of metal.

In the ink composition according to the present invention, the adhesiveness providing component is, more preferably, an acrylate monomer having a molecular weight of from 1000 to 10000. This enables such a printed object to be provided that an image layer has a more improved adhesiveness with respect to print media made of metal.

In the ink composition according to the present invention, the adhesiveness providing component is, more preferably, ω-carboxy-polycaprolactone acrylate. This enables such a printed object to be provided that an image layer has a more improved adhesiveness with respect to print media made of metal.

In the ink composition according to the present invention, the print medium may be a glass. This enables such a printed object to be provided that an image layer has an improved adhesiveness with respect to print media made of glass.

In the ink composition according to the present invention, the adhesiveness providing component is, more preferably, an epoxy acrylate monomer. This enables such a printed object to be provided that an image layer has a more improved adhesiveness with respect to print media made of glass.

In the ink composition according to the present invention, the print medium more preferably includes a metal and a glass, and the adhesiveness providing component more preferably includes: an acrylate monomer for providing an adhesiveness with respect to the metal; and an acrylate monomer for providing an adhesiveness with respect to the glass. Using this ink composition enables an image layer to be formed with a higher degree of adhesiveness both for metal and glass.

In the ink composition according to the present invention, the adhesiveness providing component is, more preferably, an acrylate monomer having a molecular weight of from 1000 to 10000 and epoxy acrylate monomer. Using this ink composition enables an image layer to be formed with a higher degree of adhesiveness with respect to both metal and glass.

In the ink composition according to the present invention, the rigidity providing component is, more preferably, at least one substance selected from the group consisting of a multi-functional acrylate monomer having an acryloyl base via a soft segment and a multi-functional acrylate oligomer having an acryloyl base via a soft segment. This makes curing-caused contraction more difficult to occur with a layer formed of the ink composition. This enables such a printed object to be provided that an image layer has an improved adhesiveness with respect to a print medium.

The ink composition according to the present invention can be suitably used as an ink composition for forming a primer layer printed on the print medium to serve as a foundation of an image layer. This enables such a printed object to be provided that an image layer has an improved adhesiveness with respect to a print medium.

The method according to the present invention for producing a printed object includes: a primer layer forming step of printing the ink composition according to the present invention over a print medium so as to form a primer layer; and an image layer forming step of forming an image layer over the primer layer. This causes the primer layer to closely contact the print medium with a higher degree of adhesive strength, and makes the primer layer more difficult to be broken due to curing-caused contraction. This enables such a printed object to be produced that an image layer closely contacts a print medium with a higher degree of adhesive strength.

In the method according to the present invention for producing a printed object, the primer layer forming step and the image layer forming step are more preferably performed using an ink-jet printer to print the ink composition for forming the primer layer and print an ink composition for forming the image layer. Using an ink-jet printer facilitates the production of a printed object in which an image layer closely contacts a print medium with a higher degree of adhesive strength.

EXAMPLES

Examples 1 to 5

Ink compositions of Examples 1 to 5 are listed on Table 1. Components were mixed according to the compositions listed on Table 1.

First, in IBXA, V160, CN131, and Example 5, V1000 was stirred for 0.5 hours. Next, in M5300 and Example 3, SR9050 was stirred for 0.5 hours, and in Example 5, SR9051 was introduced and the resulting product was stirred for 0.5 hours. Next, polymerization initiator and polymerization inhibitors (Irgacure 819, TEMPO, H-BHT), which are solid matter, were added, and the resulting product was stirred for 3 hours while being dissolved at 25° C. to 35° C. Lastly, KF-351 was added, and the resulting product was stirred for 1 hour.

TABLE 1

(Unit: wt %)

| | Example 1 | Example 2 | Example 3 | Example 4 | Example 5 |
|---|---|---|---|---|---|
| IBXA | 45 | 45 | 45.3 | 44.5 | 44 |
| M5300 | 30 | 30 | 30 | 30 | 30 |
| CN131 | 8 | 8 | 7.5 | 7.5 | 10 |
| V160 | 12 | 12 | 12 | 12 | 10 |
| V1000 | 0.5 | 0.45 | 0.4 | 0.5 | — |
| SR9050 | — | — | 0.25 | — | — |
| SR9051 | — | — | — | — | 0.5 |
| Irgacure 819 | 4 | 4 | 4 | 5 | 5 |
| KF-351 | 0.2 | 0.25 | 0.25 | 0.2 | 0.2 |
| TEMPO | 0.15 | 0.15 | 0.15 | 0.15 | 0.15 |
| BHT | 0.15 | 0.15 | 0.15 | 0.15 | 0.15 |

Details of the trade names listed on Table 1 are as follows.

IBXA: isobornyl acrylate (Osaka Organic Chemical Industry Ltd.)

M5300: ω-carboxy-polycaprolactone acrylate (Toagosei Co., LTD.)

CN131: low-viscosity aromatic monoacrylate (Sartomer)

CN131: low-viscosity aromatic monoacrylate (Sartomer)

V160: benzil acrylate (Osaka Organic Chemical Industry Ltd.)

V1000: dendrimer-type polyester acrylate (Osaka Organic Chemical Industry Ltd.)

SR9050: monofunctional methacrylic ester (Sartomer)

SR9051: EO-modified multi-functional acrylate (Sartomer)

Irgacure 819: phosphine oxide, phenylbis(2,4,6-trimethylbenzoyl) (BASF)

KF-351: Modified Silicon Fluids (Shin-Etsu Chemical Co., Ltd.)

TEMPO: 4-hydroxy-2,2,6,6-tetramethylpiperidine-N-oxyl (Evonik Japan Co., Ltd.)

BHT: 2,6-bis(1,1-dimethylethyl)-4-methylphenol (Kawaguchi Chemical Industry Co., LTD.)

[Adhesion Tests]

Adhesion tests were conducted according to JISK5600-5-6, adhesion (cross-cut method).

SUS and a glass were used as print media.

First, the inks according to Examples 1 to 5 were printed as primer inks on print media. Next, a color image was printed using LH100, manufactured by MIMAKI ENGINEERING Co., LTD.

An experiment using PR-100 as primer ink was conducted, and, for comparison purposes, another experiment was conducted in which a color image was printed directly onto a print medium, without a primer ink, using LH100.

FIG. 1A to FIG. 1F show the results of the experiment without a primer ink, the experiment using PR-100, and Example 5. FIG. 1A to FIG. 1F show the results of the adhesion tests. FIG. 1A shows a result of printing a color image on SUS without a primer ink, FIG. 1B shows a result of printing PR-100 as primer ink on SUS, FIG. 1C shows a result of printing the ink of Example 5 as primer ink on SUS, FIG. 1D shows a result of printing a color image on a glass without a primer ink, FIG. 1E shows a result of printing PR100 as primer ink on a glass, and FIG. 1F shows a result of printing the ink of Example 5 as primer ink on a glass.

As illustrated in FIG. 1A to FIG. 1F, as a result of printing a color image using the ink of Example 5 as primer ink, a superior adhesiveness was obtained. Also in Examples 1 to 4, not shown, superior adhesiveness to PR-100 were observed both in SUS and glass. Also in Examples 4 and 5, superior adhesiveness to acrylic board were observed.

INDUSTRIAL APPLICABILITY

The present invention can be utilized for ink-jet printing.

The invention claimed is:

1. An ink composition comprising:
    an adhesiveness providing component comprising an acrylate monomer for providing an improved adhesiveness with respect to a print medium that makes the ink composition more adhesive than when the ink composition does not comprise the acrylate monomer; and
    a rigidity providing component for providing a layer resulting from curing of the ink composition with an improved rigidity that makes the layer more rigid than when the ink composition does not comprise the rigidity providing component, the rigidity providing component comprising at least one substance selected from the group consisting of a EO-modified trimethylolpropane tri(meth)acrylate as a multi-functional acrylate monomer and a hyperbranched acrylate as a multi-functional acrylate oligomer.

2. The ink composition according to claim 1, wherein the print medium comprises a metal.

3. The ink composition according to claim 2, wherein the acrylate monomer of the adhesiveness providing component has a molecular weight of from 1000 to 10000.

4. The ink composition according to claim 3, wherein the adhesiveness providing component comprises ω-carboxy-polycaprolactone acrylate.

5. The ink composition according to claim 1, wherein the print medium comprises a glass.

6. The ink composition according to claim 5, wherein the adhesiveness providing component comprises an epoxy acrylate monomer.

7. The ink composition according to claim 1,
    wherein the print medium comprises a metal and a glass, and
    wherein the adhesiveness providing component comprises
        an acrylate monomer for providing an adhesiveness with respect to the metal, and
        an acrylate monomer for providing an adhesiveness with respect to the glass.

8. The ink composition according to claim 7, wherein the adhesiveness providing component comprises an acrylate monomer having a molecular weight of from 1000 to 10000 and an epoxy acrylate monomer.

9. The ink composition according to claim 1, wherein the rigidity providing component comprises at least one substance selected from the group consisting of a multi-functional acrylate monomer having an acryloyl base via a soft segment and a multi-functional acrylate oligomer having an acryloyl base via a soft segment.

10. The ink composition according to claim 1, wherein the ink composition is an ink composition for forming a primer layer printed over the print medium to serve as a foundation of an image layer.

11. A method for producing a printed object, the method comprising:
    a primer layer forming step of printing the ink composition according to claim 1 over a print medium so as to form a primer layer; and
    an image layer forming step of forming an image layer over the primer layer.

12. The method for producing a printed object according to claim 11, wherein the primer layer forming step and the image layer forming step are performed using an ink-jet printer to print the ink composition for forming the primer layer and print another ink composition for forming the image layer.

13. The ink composition according to claim 2, wherein the rigidity providing component comprises at least one substance selected from the group consisting of a multi-functional acrylate monomer having an acryloyl base via a soft segment and a multi-functional acrylate oligomer having an acryloyl base via a soft segment.

14. The ink composition according to claim 3, wherein the rigidity providing component comprises at least one substance selected from the group consisting of a multi-functional acrylate monomer having an acryloyl base via a soft segment and a multi-functional acrylate oligomer having an acryloyl base via a soft segment.

15. The ink composition according to claim 4, wherein the rigidity providing component comprises at least one substance selected from the group consisting of a multi-functional acrylate monomer having an acryloyl base via a soft segment and a multi-functional acrylate oligomer having an acryloyl base via a soft segment.

16. The ink composition according to claim 5, wherein the rigidity providing component comprises at least one substance selected from the group consisting of a multi-functional acrylate monomer having an acryloyl base via a soft segment and a multi-functional acrylate oligomer having an acryloyl base via a soft segment.

17. The ink composition according to claim 6, wherein the rigidity providing component comprises at least one substance selected from the group consisting of a multi-functional acrylate monomer having an acryloyl base via a soft segment and a multi-functional acrylate oligomer having an acryloyl base via a soft segment.

18. The ink composition according to claim 7, wherein the rigidity providing component comprises at least one substance selected from the group consisting of a multi-functional acrylate monomer having an acryloyl base via a soft segment and a multi-functional acrylate oligomer having an acryloyl base via a soft segment.

19. The ink composition according to claim 8, wherein the rigidity providing component comprises at least one substance selected from the group consisting of a multi-functional acrylate monomer having an acryloyl base via a soft segment and a multi-functional acrylate oligomer having an acryloyl base via a soft segment.

* * * * *